Jan. 8, 1963     L. TRITSCH     3,072,249
COVERED ADHESIVE BANDAGES
Filed Sept. 19, 1960     2 Sheets-Sheet 1
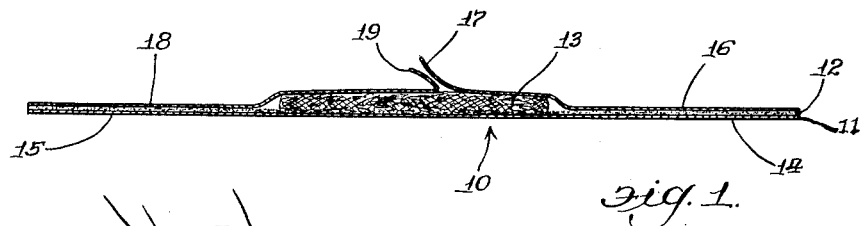
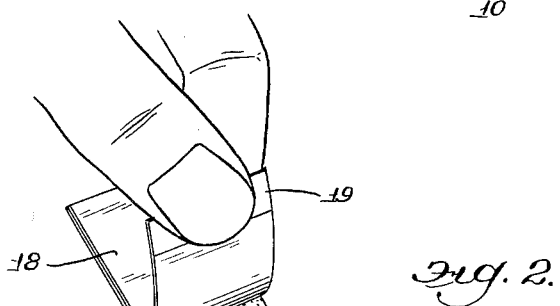
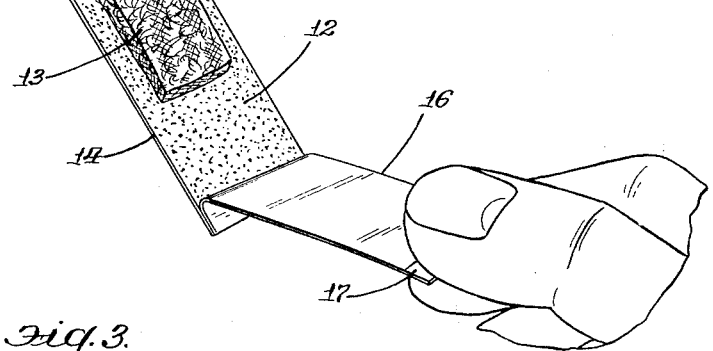
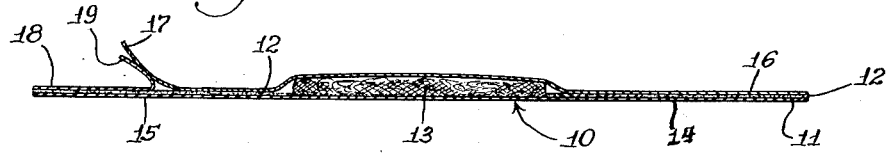
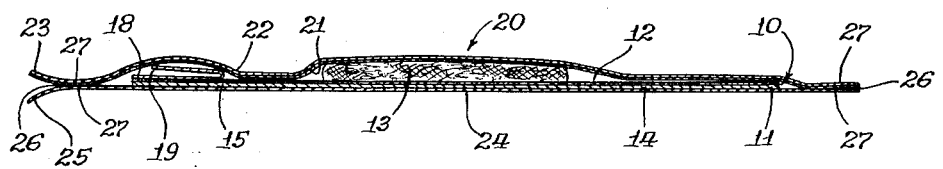
INVENTOR.
Ludwig Tritsch
BY
Robt. L. Andera
Atty.

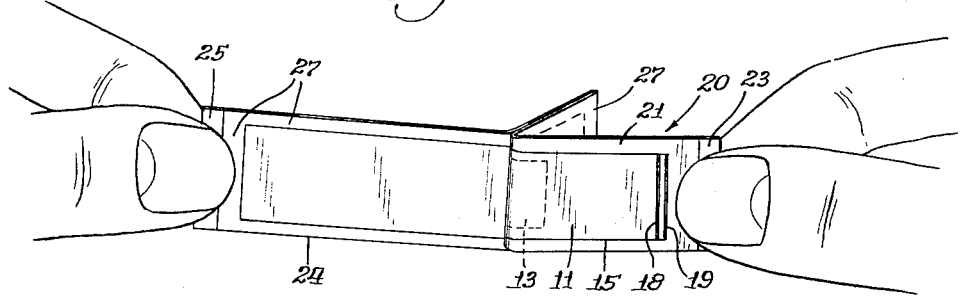
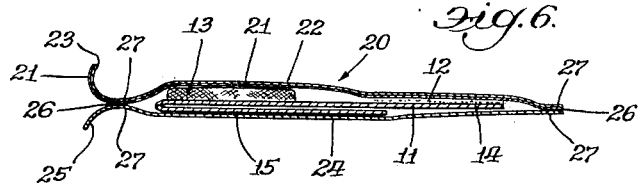
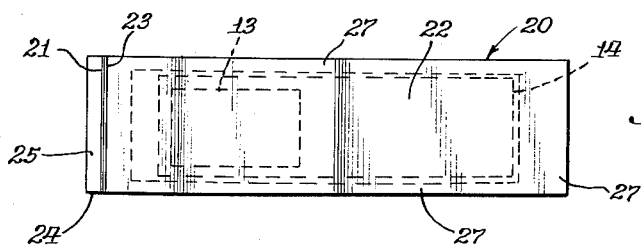
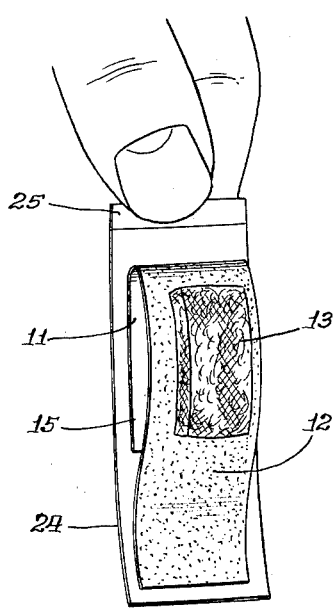

United States Patent Office 3,072,249
Patented Jan. 8, 1963

3,072,249
COVERED ADHESIVE BANDAGES
Ludwig Tritsch, Wilmette, Ill., assignor to The Kendall Company, Boston, Mass., a corporation of Massachusetts
Filed Sept. 19, 1960, Ser. No. 56,982
11 Claims. (Cl. 206—63.2)

This invention relates to covered adhesive tapes, and particularly covered adhesive bandages, wherein the coverings in contact with different adhesive portions of the tape or bandage are differentially releasable therefrom.

Adhesive bandages normally comprise a backing and an adhesive layer on one side thereof, usually with an absorbent pad positioned on the adhesive. The backing may be made of any suitable fabric or flexible plastic material. The adhesive generally is of the type which is tacky to the touch and readily adherent to the surface against which it is placed in contact upon slight application of pressure. Such adhesives, commonly referred to as pressure-sensitive adhesives, are well-known in the art and are usually based upon a combination of a rubbery elastomer and a tackifier resin, with or without such other additives as fillers, plasticizers, and stabilizers.

In accordance with the requirements of the U.S. Pharmacopoeia, the adhesive bandage must be sterile and packaged individually in such manner that sterility is maintained until the package is opened. The U.S. Pharmacopoeia also requires that the adhesive surface be protected by strips or panels of a protective material which are not less in width than that of the bandage.

In known commercial forms of the bandages of the type described in the U.S. Pharmacopoeia, the adhesive surface is protectively covered by a pair of overlapping panels and the thus covered bandage is again protected by a separate wrapping material enveloping the entire bandage. The separate wrapper is suitably sealed to prevent loss of sterility of the contents thereof due to penetration by bacteria or other contaminating influences. After removal of the bandage from the enveloping wrapper the overlapping panels, commonly called facing panels or members, must be stripped from the adhesive. Conventionally, the facing members are so arranged on the surface of the adhesive that substantially equal and opposite pulling forces normally are simultaneously applied to the facing members during the stripping operation. Exactly which one of the facing members will strip off first is unpredictable. Under conditions existing when such bandages are to be used this can be exceptionally irritating, particularly in the case of self-application of the bandage to a wound on one of the hands. If the bandage remains adherent to the panel held by the injured hand the bandage must be transferred to the other hand for application to the wound site.

In its broad aspects, this invention no longer leaves to chance which end of the adhesive bandage remains detachably adherent to a facing member after stripping one of the facing members therefrom. In accordance with the broad aspects of this invention a protective member in contact with a portion of the adhesive surface of the bandage has a greater degree of adherence to the adhesive than another protective member also in contact with a portion of the adhesive surface. In one of the broadest applications of this invention a portion of the adhesive surface of the bandage is covered with a facing member which will always be stripped therefrom prior to removal of the other facing member when both facing members are simultaneously subjected to substantially equal and opposite stripping forces. Since the order of detachable adherence can be predetermined, the initial grasping of the facing members can be planned so that the bandage subsequently may be self-applied with a minimum of manipulations. Simultaneous removal of the members protectively facing the adhesive is precluded, thereby reducing the chances of contaminating the bandage before application to a wound site.

This invention also makes more practicable prior art suggested structures wherein the facing members also function as the sterility protecting wrapper for the bandage. Although the prior art proposals refer to heat seals between panels of thermoplastic materials having this dual function, the prior art teachings do not mention the difficulties encountered with such heat seals. Such heat seals must be impervious to non-sterile external environment. The seal must be strong enough to resist accidental opening during normal packaging operations. On the other hand, the panels must be relatively easily and uniformly rupturable at or along the heat seals for proper opening of the prior art proposed structures. This is not always obtainable with panels of the same plastic material. The combination of the protective covering materials employed in this invention permits production of impervious heat sealed packages in which the relationship between the strength of the coverings in the heat sealed areas and the strength of the immediately adjacent areas of the protective coverings is such that the finished package can be opened without random tearing of the protective coverings.

In accordance with this invention, a pressure-sensitive adhesive tape or bandage is covered by a pair of protective members in which at least the adhesive-contacting surfaces thereof are composed of different materials, which materials develop different degrees of adherence to the pressure-sensitive adhesive layer. For purposes of this invention the differentially releasable materials must also satisfy the requirements of the U.S. Pharmacopoeia as a protective covering; the materials must be inert to the adhesive, that is, they must not inter-act objectionably with the pressure-sensitive adhesive; the materials must not develop an adherence to the layer of the pressure-sensitive adhesive greater than the adherence of the pressure-sensitive adhesive layer to the tape backing; the materials must not develop an adherence for the pressure-sensitive adhesive greater than the cohesive strength of the pressure-sensitive adhesive; the materials must be separable from the pressure-sensitive adhesive with less force than that which permanently deforms the tape; the absolute level of adherence of these materials to the adhesive must be reasonably low to be relatively easily strippable therefrom; if used in a combined facing material and wrapper, the differentially releasable material preferably should be capable of forming heat sealed packages, the panels of which can be separated from each other along the heat sealed portions without random tearing of the material.

Materials which satisfy all of the aforelisted requirements and from which combinations may be selected to provide differentially releasable facing members include organic and inorganic materials, for example polyalkenes such as low density polyethylene, high density polyethylene, and stereo-regular poly-alpha olefins such as stereo-regular polypropylene and poly alpha-butene; aluminum foil; silicone resins; cellulose resins, such as cellophane, cellulose triacetate, methyl cellulose, and ethyl cellulose; vinyl resins, such as vinyl chloride polymers, vinyl chloride-vinyl acetate polymers, polyvinyl alcohol polymers, and vinylidene chloride polymers; polystyrene; polyethylene terephthalate; polytetrafluoroethylene; and butadiene-acrylonitrile polymers, to name a few. Facing members may be made from these materials either as self-supporting foils or films or as laminates with reinforcing materials, such as laminates or coatings on paper or fabrics and the like. Suitable combinations may be selected by simply determining the force required to strip the facing members from the adhesive. Blends of the thermoplastic materials may also be employed to either increase or decrease the adherence of the panels for the adhesive. Only relatively slight differences in stripping forces will permit the desired differential releasability in accordance with this invention.

The following are specific examples of tapes faced with protective panels wherein one of the panels is more easily strippable from the adhesive and hence will be removed therefrom first when both panels are simultaneously subjected to substantially equal and opposite stripping forces.

*Adhesive Tape C*

A 0.007" thick plasticized polyvinyl chloride film containing minor amounts of light and heat stabilizers, fillers and pigments, was coated with an adhesive of the following composition from a heptane solution thereof.

| Ingredients: | Parts by weight |
|---|---|
| Elastomers | 105 |
| Tackifier resins | 102 |
| Fillers | 18 |
| Plasticizers | 7 |
| Age resistors | 7 |

| Ex. | Adhesive tape | Panel No. I | Stripping force, ozs. | Panel No. II | Stripping force, ozs. |
|---|---|---|---|---|---|
| 1 | A | Low density polyethylene | 3 | Cellulose acetate | 10 |
| 2 | B | ----do---- | 11 | High density polyethylene | 20 |
| 3 | C | ----do---- | 10 | ----do---- | 23 |
| 4 | A | ----do---- | 3 | Unplasticized polyvinylchloride | 9 |
| 5 | B | ----do---- | 11 | Stereo-reg. polypropylene | 13 |
| 6 | C | ----do---- | 10 | Cellulose acetate | 16 |
| 7 | A | Stereo-reg. polypropylene | 4 | ----do---- | 10 |
| 8 | B | High density polyethylene | 20 | ----do---- | 26 |
| 9 | A | ----do---- | 23 | ----do---- | 16 |
| 10 | B | Teflon [1] | 3 | Mylar [2] | 8 |
| 11 | C | ----do.[1] | 10 | ----do.[2] | 34 |
| 12 | A | Low density polyethylene | 10 | ----do.[2] | 16 |
| 13 | C | Silicone coated paper | 0.4 | Stereo-reg. polypropylene | 4 |
| 14 | C | Cellulose acetate | 16 | Low density polyethylene | 10 |
| 15 | A | ----do---- | 10 | Teflon [1] | 3 |
| 16 | A | Mylar [2] | 8 | Cellulose acetate | 10 |
| 17 | C | ----do.[2] | 16 | Low density polyethylene | 10 |
| 18 | A | ----do.[2] | 8 | Stereo-reg. polypropylene | 4 |
| 19 | B | Unplasticized vinyl chloride | 37 | Low density polyethylene | 11 |
| 20 | C | ----do---- | 15 | ----do---- | 10 |
| 21 | A | ----do---- | 9 | ----do---- | 3 |
| 22 | C | ----do---- | 15 | Polystyrene | 21 |

[1] Polytetrafluorethylene film.
[2] Polyethylene terephthalate film.

*Adhesive Tape A*

A plasticized polyvinyl chloride film about 0.003" thick containing minor amounts of light and heat stabilizers, fillers, and pigments, was coated with the following pressure-sensitive adhesive from a heptane solution thereof.

| Ingredients: | Parts by weight |
|---|---|
| Pale crepe | 76 |
| Tackifier resins | 78 |
| Fillers | 71 |
| Age resistors | 2 |

The tackifier resins consisted of a mixture of glycerol ester of hydrogenated rosin, dimerized abietic acid and pentaerythritol ester of hydrogenated rosin. The fillers consisted of a mixture of titanium dioxide and zinc oxide. The age resistors consisted of a mixture of polymerized trimethyl dihydroquinoline, diorthotolylethylene diamine, and a condensation product of acetone and aniline.

*Adhesive Tape B*

A 0.007" thick low density polyethylene film was coated with an adhesive of the following composition by a calendering process.

| Ingredients: | Parts by weight |
|---|---|
| Elastomers | 74 |
| Tackifier resins | 40 |
| Fillers | 27 |
| Age resistors | 1 |

Approximately 1.5 parts by weight of a mixture of a zinc salt of mercaptobenzothiazole and dipentamethylene thiuram tetrasulfide was added to the ingredients in which the elastomeric portion was a mixture of smoked sheet and butadiene-styrene rubber, the tackifiers were a blend of polyterpene resin, a hydrocarbon resin and disproportionated rosin, and the age resistors were a mixture of an alkylated polyhydroxyl phenol, polymerized trimethyl dihydroquinone and hydrocarbon substituted diaryl amines.

The elastomers were a blend of butadiene-styrene rubber and pale crepe and the tackifiers were a mixture of polyterpene resin and a glycerol ester of hydrogenated rosin. Synthetic beeswax, a sebacic acid polyester and epoxidized soybean oil comprised the plasticizers. The fillers were a mixture of carbon black and silica. Resistance to aging was imparted to the adhesive by a mixture of polymerized trimethyl dihydroquinoline, alkylated polyhydroxy phenol, and hydrocarbon substituted diaryl amines.

Faced samples of the tapes were prepared by pressing the panels on the exposed adhesive coating of the tape by rolling twice with a 10 lb. roller. The faced tapes were then sterilized in an ethylene oxide sterilization system at a temperature of about 140°–150° F. The forces necessary to remove the panels from the adhesive were measured after about 24 hours' aging at room temperature after sterilization.

These stripping forces were measured on an Instron tensile tester, the tape and the panel being positioned between the jaws of the tester so that the panel was peeled from the adhesive tape in much the same manner as during manual stripping of the facing member from the tape. The stripping forces are recorded in ounces per inch width of tape. The rate of stripping was about 2 inches per minute. The tapes withstood the stripping force without permanent deformation to the tape.

The panels requiring less stripping force will always be removed first from the tape. As shown in the foregoing tabulated examples, the degree of adhesion for a given facing material will depend upon the composition of the adhesive. The degree of adhesion will also depend upon the conditions under which the tape is faced and subsequently processed. Accordingly, it is to be understood that the stripping force values are not absolute values but may vary in magnitude depending upon the pressure applied in facing the adhesive and the temperature to which the faced tape is exposed.

The aforementioned polyalkenes are a particularly suitable class of materials from which panels can be made which serve a dual function, acting as facing members and also as a packaging material. The combination of high density polyethylene and low density polyethylene panels is particularly suitable for this dual function because of their ability to form heat sealed packages, the panels of which are easily separable without random tearing and which are predeterminably releasable from the adhesive surface in the manner heretofore described.

Specific forms in which the advantages of this invention may be realized will now be more particularly described with reference to the drawings in which:

FIG. 1 is a cross-sectional view of a conventional adhesive bandage with the adhesive surface protected with facing members in accordance with this invention;

FIG. 2 is an isometric view of the bandage of FIG. 1 in which the facing members are being stripped therefrom;

FIG. 3 is a cross-sectional view of a conventional adhesive bandage wherein the arrangement of the facing members are different from those shown in FIG. 1;

FIG. 4 is a cross-sectional view of a modification of the adhesive bandage of FIG. 3, wherein one of the facing members also serves the function of being one of the panels of the package encasing the bandage;

FIG. 5 is an isometric view of the manner in which the packaged adhesive bandage of FIG. 4 may be opened;

FIG. 6 is a cross-sectional view of another form which this invention may take, wherein a bandage is detachably adhered to opposite panels of the package encasing the bandage;

FIG. 7 is a planar view of the packaged adhesive bandage shown in FIG. 6; and

FIG. 8 is an isometric view of the bandage of FIG. 6 remaining detachably adherent to one of the panels of the bandage after the package has been completely opened.

In each of the drawings the bandage is generally designated by the numeral 10 wherein the bandage includes a backing 11 of uniform width having a pressure-sensitive adhesive layer 12 on one side thereof an an absorbent compress or pad 13 positioned substantially medially on the adhesively coated side of the backing. The adhesively coated end portions 14 and 15 serve to secure the absorbent pad in place over a wound. The adhesive bandage shown in the drawings for simplified illustration of this invention is a strip-type bandage popularly referred to as a finger bandage. Circular bandages and other elongate forms of tape, with or without an absorbent pad, may also be protectively covered in accordance with this invention.

Referring to FIG. 1, the adhesively coated end portion 14 of the bandage is covered with a facing member 16 made of low density polyethylene film. The facing member 16 is in adhesive contact with the adhesive layer 12 commencing at one end of the tape and terminating adhesive contact just prior to the edge of the pad 13 and continuing to overlap a part of said pad, as shown in FIG. 1. A terminal part of the facing member 16 overlying the pad 13 is folded to conveniently provide a flap 17. The adhesively coated end portion 15 of the bandage is covered by a high density polyethylene film facing member 18. The facing member 18 commences adhesive contact at the other end of the adhesive bandage and proceeds to partly overlap the pad 13. The facing member 18 at the end over the pad terminates in a flap 19. Both the flaps 17 and 19 may be grasped and pulled in opposite directions for removal of the facing members in the manner shown in FIG. 2.

As shown in FIG. 2 the low density polyethylene facing member 16 is first stripped from the bandage even though the stripping forces simultaneously applied to the facing member 18 and the facing member 16 are substantially equal and opposite to each other. The differential releasability of the low and high density polyethylene facing members permits a pre-planned handling of the covered bandage to ready it for application to a wound site. When the bandage is to be applied to a wound on the right hand, for example, the flap 19 of the high density polyethylene facing member 18 may be grasped in the left hand. The flap 17 of the low density polyethylene facing member 16 is grasped by the fingers of the right hand. When pulled apart, the panel 16 is removed from end portion 14 of the bandage. After the adhesively coated end portion 14 of the bandage has been secured to the skin adjacent the wound, the high density polyethylene facing member 18 is then stripped from the end portion 15, automatically placing and securing the bandage in proper position over the wound. There is no necessity for shifting the bandage to the other hand as would have been required if the opposite panel were removed during the initial stripping operation. This invention affords minimum of handling of the adhesive bandage, reducing the chances of contaminating the sterile pad, and provides for quick application.

In FIG. 3, the low density polyethylene facing member 16 extends from the adhesive surface of the end portion 14 over the pad 13 and into contact with a part of the adhesive surface of the end portion 15. The high density polyethylene facing member number 18 is in contact with the adhesively coated end portion 15 beginning at the end thereof and terminating adhesive contact therewith at a line substantially common with the line at which the facing member 16 terminates adhesive contact with the adhesive layer on end portion 15. Both of the panel numbers 16 and 18 have extended flaps 17 and 19, respectively, suitable for grasping and applying pulling forces thereto to grip the channel 16 from the bandage. Again, the facing member 16 is always stripped first from the bandage because of the lower degree of adherence of the low density polyethylene surface of facing member 16 for the surface of the adhesive layer 12. In this modification of the covered bandage, the absorbent pad 13 will always be free of obstruction from the facing member 18 since the facing member 16 having the lesser affinity for adherence to the adhesive is stripped first from the bandage.

In order to meet the requirements of the U.S. Pharmacopaeia the covered bandages of FIG. 1-3 must be wrapped in individual sterility protecting containers. The covered bandage may be packaged in a suitable separate wrapper. A related feature of this invention is a heat sealed package wherein at least one of the aforedescribed differentially releasable facing members also serves as a panel portion of the wrapper. FIGS. 4-8 illustrate two examples of prior proposed structures but differ therefrom in employing a combination of panels having different releasibilities from the adhesive surface, and which panels, after heat sealing the marginal edges together, are separable from each other without random tearing of the panels.

FIG. 4 shows a completely packaged adhesive bandage wherein the top panel 20 is in contact with the adhesive surface 12 on both of the end portions 14 and 15. The surface inside the envelope of the panel 20 has a lesser degree of adherence to the adhesive than the facing member 18 which is in covering contact with a part of the adhesive layer 12 on end portion 15 of the bandage. In this respect, the adhesive of the bandage is covered in a manner similar to that shown in FIG. 3; however, the panel 20 is wider and longer than the bandage 10 which it overlies, thus presenting marginal portions 27 extending beyond the ends and the longitudinal edges of the bandage 10. The facing member 18 is substantially coextensive in width with the bandage, the same as in the structure shown in FIGS. 1-3. For reasons which will be apparent, the surface 21 of the panel 20 preferably is such that it has a lesser degree of adherence for the adhesive than the member 18.

In FIG. 4 the panel 20 is shown as a laminate of a low density polyethylene film 21 and a high density polyethylene film 22. The surface of the low density polyethylene lamina faces into the package. Panel 24 is a high density polyethylene film, also having marginal edges 27 extending beyond the marginal edges of the bandage 10. The marginal portions of both panel 20 and panel 24 are in contact with each other and heat sealed together. At one end thereof, the line of the heat seal may be disposed inwardly from the terminal edges of the panels 20 and 24 to form, respectively, tabs 23 and 25. The numeral 26 designates the line of the heat seal.

FIG. 5 illustrates the opening of the bandage shown in FIG. 4. As illustrated, the tab 25 has been grasped by the fingers of the left hand and the tab 23 by the fingers of the right hand. In the illustration of FIG. 5 it is again assumed that the wound to be covered is on the right hand. The bandage remains adherent to the panel 20 during separation of the panel 24 from the panel 20. After the panel 24 has been removed to expose the uncoated backside of the bandage 10, the flap 19 is grasped by the fingers of the left hand and the same pulling action used as was used in the separation of the panels 20 and 24 with the result that the panel 20 is stripped from contact with the adhesive layer 12. The bandage remains detachably adherent to the high density polyethylene facing member 18, thereby rendering the adhesive tape immediately available for application to the wound site without changing the grasp on the flap 19 from the fingers of the left hand.

Referring to FIGS. 4 and 5 the heat seal between the surface of the low density polyethylene film 21 and the surface of the higher melting linear polyalkene, specifically, high density polyethylene, is a bacteria impervious seal which may be formed under conditions which do not substantially deform the marginal portions of the panels 20 and 24. In separating the panel 20 from panel 24 in the manner shown in FIG. 5, the heat sealed juncture 26 may either rupture easily, the heat sealed surface of panel 24 separating from the heat sealed surface 21, or the portion of the lamina 21 in heat sealed juncture with panel 24 at the end at which the pull tabs 23 and 25 are located may begin to delaminate from the lamina 22. In the latter case the delamination across the width of the panel 20 ceases after that portion of the heat sealed juncture is broken, continued pulling of the two panels causing separation along the longitudinal heat sealed edges of the package. Such separation occurs if the juncture in the heat sealed marginal portions of the panel is stronger than the low density polyethylene lamina 21. In any event, the panels 20 and 24 do not randomly tear upon application of the forces to open the package. Satisfactory heat seals between the low density polyethylene side of the laminate panel 20 and the high density polyethylene film 24 have been produced with a conventional heated bar sealer (Sentinel Heat Sealer, Model 24A). Temperatures above the melting point of the low density polyethylene and below the melting point of the high density polyethylene under relatively mild pressure and short dwell times may be employed. Specifically, satisfactory heat seals have been obtained at 250° F. at 30 pounds per square inch with dwell times ranging from between 1 and 4 seconds. The combined thickness of the marginal portion of the panels 20 and 24 were from 6 mils to 8 mils thick. Satisfactory results have been obtained with heat seals between a 4 mil panel of a high and low density polyethylene laminate and a 2 mil panel of high density polyethyline film.

The packaged folded bandage illustrated in FIGS. 6–8 not only advantageously offers a structure in which the package material serves as the facing members, but also has the advantage of employing lesser amounts of packaging material. One of the major obstacles in the commercial development of this type of a packaged folded adhesive bandage (as in the packaged bandage of FIG. 4) has been the difficulty in producing satisfactory seals around the marginal edges of the folded bandage. Complex adhesive coating steps for adhesive seals may be avoided by employing a proper combination of thermoplastic differentially releasable panels, or panels having surfaces of thermoplastic differentially releasable materials which are capable of forming easily openable heat sealed packages.

FIGS. 6 and 8 show that the end portion 15 of the bandage is reversely folded so that the uncoated surface of the backing 11 of the end portion 15 is substantially contiguous with portions of the uncoated surface of the unfolded part of the backing. The envelope in which the bandage is sealed consists of two panels 20 and 24. The surface of the panel 20 inside the envelope comprises a low density polyethylene surface 21. The low density polyethylene surface 21 is suitably reinforced by a lamina 22, which conveniently may be a high density polyethylene film. Obviously, other means may be employed to reinforce the low density polyethylene to prevent substantial extension under the stress applied thereto during opening of the package. For example, reinforcing strands may be emebedded in a low density polyethylene film. A suitable alternate is a low density polyethylene coated fibrous web, either woven or non-woven, such as paper. In all instances the low density polyethylene coating faces into the envelope.

The bottom panel 24 is a linear polyalkene and as previously described in connection with FIG. 4 may be high density polyethylene. Both panels 20 and 24 have marginal portions 27 extending beyond the edges of the bandage, as clearly shown in FIG. 7. These marginal portions 27 are heat sealed together in the aforementioned manner, the numeral 26 in FIG. 6 designating the heat sealed contact between the two panels.

FIG. 8 illustrates the usual appearance of the adhesive bandage remaining detachably adherent to the panel 24 after the panel 20 has been completely stripped therefrom.

As is apparent, the panel 20 is stripped from adhesive contact with the bandage 10 simultaneously with the action of separating the panels to open the envelope encasing the bandage. Again assuming application of the bandage to a wound site on the right hand, or some other portion of the body which can be reached by the left hand, the adhesive bandage is ready for application without the need or necessity of changing the grasp initially employed to gain access to the bandage.

This predetermined detachable adherence aspect of this invention avoids substantial and unnecessary manipulation of the bandage, particularly in the case of the modification shown in FIGS. 6–8. Bandages are often used under emergency conditions and the unpredictable releasability of the bandages from their facing members and their packages often unduly complicate the application thereof to a wound site. This invention is designed to avoid such irritating complexities, affording proper application while reducing the chances of accidental loss of sterility during the opening of the package and application of the bandage.

From the foregoing it is clear that this invention provides a predetermined order of removal of the protective coverings from the surface of the adhesive; that undue delays in the application of the bandage to the wound are avoided; that manipulation of the bandage prior to and during application to a wound is minimized and simplified; and that the chances of contaminating the bandage during preparation thereof for application to a wound are lessened. In addition, this invention eliminates a separate sterility protecting wrapper, providing panels which serve the combined function of a facing strip and a wrapper and permits uniformly openable heat sealed packages, while still providing a predetermined order of removal and the advantages which result therefrom.

What is claimed is:

1. In an adhesive tape comprising a backing and an adhesive layer thereon, the combination therewith of a first panel in covering contact with a part of the adhesive layer beginning at one end of said backing and a second panel in covering contact with another part of the adhesive layer beginning at the other end of said backing, said first and second panels each terminating adhesive contact with said adhesive layer intermediate the ends of said backing with flaps free of contact with said adhesive layer, the surface of said first panel in contact with the adhesive layer having a degree of adherence to said adhesive layer different from the surface of said second panel in contact with said adhesive layer, whereby, when the flaps of said panels are separately grasped and simultaneously subjected to substantially equal and opposite pulling forces to peel the panels from said tape, one panel predeterminately always is removed first, the adhesive tape remaining detachably adherent to the other panel by reason of the greater adherence of said other panel for the adhesive layer and ready for application without the necessity of changing the grasp on said other panel.

2. A packaged adhesive bandage comprising an adhesive bandage positioned between overlying first and second panels separably secured together along the marginal edges thereof beyond the edges of said adhesive bandage to form an envelope encasing said bandage, the surface inside the envelope of said first panel having a degree of adherence to a pressure-sensitive adhesive layer different from the surface inside the envelope of said second panel, said bandage encased in said envelope including an adhesive tape having a backing and a pressure-sensitive adhesive layer on one side thereof, said adhesive tape folded at one end thereof so that the adhesive layer on said folded end is in contact with said surface of said first panel and the adhesive layer at the other end is in contact with said surface of said second panel, whereby when said panels are simultaneously subjected to substantially equal and opposite pulling forces to separate said panels from each other in a peeling action one of the panels predeterminately always is removed first from said adhesive bandage, said adhesive bandage remaining detachably adherent to the other panel by reason of the greater adherence of said other panel for the adhesive layer and ready for application without the necessity of changing the grasp on said other panel.

3. A packaged adhesive bandage comprising an adhesive bandage positioned between overlying first and second panels separably secured together around the marginal edges thereof beyond the edges of said bandage to form an envelope encasing said bandages, the composition of the first panel surface inside the envelope being different from the corresponding surface of said second panel and having a degree of adherence to a pressure-sensitive adhesive layer different from the second panel surface said bandage encased in said envelope including an adhesive tape having a backing and a pressure-sensitive adhesive layer on one side thereof, said adhesive tape folded at one end thereof so that the adhesive layer on said folded end is in contact with said surface of said first panel and the adhesive layer at the other end is in contact with said surface of said second panel, whereby when said panels are simultaneously subjected to substantially equal and opposite pulling forces to separate said panels from each other in a peeling action one of the panels predeterminately always is removed first from said ahesive bandage, said adhesive bandage remaining detachably adherent to the other panel by reason of the greater adherence of said other panel for the adhesive layer and ready for application without the necessity of changing the grasp on said other panel.

4. A packaged adhesive bandage comprising an adhesive bandage positioned between overlying first and second panels heat sealed together along the marginal edges thereof beyond the edges of said bandage to form an envelope encasing said bandage, the surface inside the envelope of said first panel and the surface inside the envelope of said second panel comprising respectively, different materials selected from the group consisting of low density polyethylene, high density polyethylene and stereo regular polymers of alpha-olefins, said bandage encased in said envelope including an adhesive tape having a backing and an adhesive layer on one side thereof, said adhesive tape folded at one end thereof so that adhesive layer on said folded end is in contact with the surface of said first panel and the adhesive layer at the other end of said bandage is in contact with the surface of said second panel whereby when said panels are simultaneously subjected to substantially equal and opposite pulling forces to separate said panels from each other in a peeling action the panels separate from each other uniformly along the heat seals without random tearing of said panels, one of the panels predeterminately always being removed first, said adhesive bandage remaining detachably adherent to the other panel by reason of the greater adherence of said other panel for the adhesive layer and ready for application without the necessity of changing the grasp on said other panel.

5. The packaged adhesive bandage in accordance with claim 4 wherein said first panel comprises a laminate of a high density polyethylene film and a low density polyethylene film and a surface of said second panel comprises high density polyethylene, said panels arranged so that the low density polyethylene lamina of said first panel and the high density polyethylene surface of said second panel face into the envelope.

6. In an adhesive tape comprising a backing and a pressure-sensitive adhesive layer thereon, the combination therewith of a first panel in covering contact with a part of the adhesive layer beginning at one end of said backing and a second panel in covering contact with another part of the adhesive layer beginning at the other end of said backing, said first and second panels each terminating adhesive contact with said adhesive layers intermediate the ends of said backing with flaps free of contact with said adhesive layer, the composition of the first panel surface in contact with the adhesive layer being different from the corresponding surface of said second panel and having a degree of adherence to the pressure-sensitive adhesive layer different from said second panel surface, whereby, when the flaps of said panels are separately grasped and simultaneously subjected to substantially equal and opposite pulling forces to peel the panels from said tape, one panel predeterminately always is removed first, the adhesive tape remaining detachably adherent to the other panel by reason of the greater adherence of said other panel for the adhesive layer and ready for application without the necessity of changing the grasp on said other panel.

7. In an adhesive tape in accordance with claim 6 wherein the adhesive-contacting surfaces of said first and second panel comprise, respectively, different materials selected from the group consisting of low density polyethylene, high density polyethylene, and stereo regular polymers of alpha-olefins.

8. In an adhesive tape in accordance with claim 6 wherein said tape includes an absorbent pad positioned on the adhesively coated side of said backing and intermediate the ends of said tape to provide end portions of said tape extending beyond edges of said pad.

9. In an adhesive tape in accordance with claim 6 wherein said tape includes an absorbent pad positioned on the adhesively coated side of said backing and intermediate the ends of said tape to provide end portions of said tape extending beyond edges of said pad and wherein said second panel covers said absorbent pad and is in contact with parts of the adhesive layer extending beyond edges of said pad.

10. In an adhesive tape in accordance with claim 6 wherein said tape has an absorbent pad positioned on the adhesively coated side of said backing and intermediate the ends of said tape to provide end portions of said tape extending beyond edges of said pad, said second panel covering said absorbent pad and being in contact with parts of the adhesive layer on the end portions of the tape extending beyond edges of said pad, said second panel having marginal edges extending beyond the ends and edges of said adhesive tape, said adhesive tape being positioned on a bottom sheet with the uncoated side of said backing contiguous therewith, said sheet having marginal portions extending beyond the ends and edges of said backing and separably secured to the marginal edges of said second panel, said bottom sheet and said second panel being separable from each other when subjected to substantially equal and opposite pulling forces to separate the sheet and the second panel from each other.

11. In an adhesive tape in accordance with claim 10 wherein said second panel comprises a laminate of a low density polyethylene film with a high density polyethylene film, the low density polyethylene surface of said liminate being the surface which is in covering contact with said adhesive layer, the surface of the marginal portions of said bottom sheet comprising high density polyethylene heat sealed to the low density polyethylene surface at the marginal edges of said second panel to form a package encasing said tape, said package being easily openable uniformly along the heat sealed portions without random tearing of said second panel and said sheet when said sheet and said second panel are subjected to substantially equal and opposite pulling forces to separate the sheet and the panel from each other.

References Cited in the file of this patent

UNITED STATES PATENTS

| | | |
|---|---|---|
| 2,172,455 | Samuel | Sept. 12, 1939 |
| 2,703,083 | Gross | Mar. 1, 1955 |
| 2,822,357 | Brebner et al. | Feb. 4, 1958 |
| 2,834,768 | Friedlander | May 13, 1958 |
| 2,897,961 | Bush | Aug. 4, 1959 |

FOREIGN PATENTS

| | | |
|---|---|---|
| 567,360 | Great Britain | Feb. 12, 1945 |
| 1,140,943 | France | Mar. 11, 1957 |

UNITED STATES PATENT OFFICE
CERTIFICATE OF CORRECTION

Patent No. 3,072,249                                     January 8, 1963

Ludwig Tritsch

It is hereby certified that error appears in the above numbered patent requiring correction and that the said Letters Patent should read as corrected below.

Columns 3 and 4, in the table, lines 13 to 37 thereof, Examples 9 to 13 should appear as shown below instead of as in the patent:

| Ex. | Adhesive tape |
|---|---|
| 9 | C |
| 10 | A |
| 11 | B |
| 12 | C |
| 13 | A | column 3, line 74, for "polyhydroxyl" read -- polyhydroxy --; column 5, line 41, for "an", first occurrence, read -- and --; column 6, line 33, for "grip the channel" read -- strip the panel --; column 7, line 67, for "polyethyline" read -- polyethylene --; column 8, line 22, for "emebedded" read -- embedded --; column 9, line 51, for "bandages" read -- bandage --; column 10, line 39, for "layers" read -- layer --; column 11, line 20, for "liminate" read -- laminate --.

Signed and sealed this 22nd day of October 1963.

(SEAL)
Attest:

ERNEST W. SWIDER                                    EDWIN L. REYNOLDS
Attesting Officer                               Acting Commissioner of Patents